United States Patent
Eklund et al.

[11] Patent Number: 6,035,001
[45] Date of Patent: Mar. 7, 2000

[54] METHOD AND ARRANGEMENT IN A TRANSMISSION SYSTEM

[75] Inventors: Johan Eklund, Stockholm; Patrik Melander, Ekerö, both of Sweden

[73] Assignee: Telefonaktiebolaget LM Ericsson, Stockholm, Sweden

[21] Appl. No.: 08/809,174

[22] PCT Filed: Sep. 26, 1995

[86] PCT No.: PCT/SE95/01094

§ 371 Date: Mar. 18, 1997

§ 102(e) Date: Mar. 18, 1997

[87] PCT Pub. No.: WO96/10868

PCT Pub. Date: Apr. 11, 1996

[30] Foreign Application Priority Data

Oct. 3, 1994 [SE] Sweden ................... 9403337

[51] Int. Cl.[7] .................................. H04L 27/06
[52] U.S. Cl. .......................... 375/316; 341/139
[58] Field of Search .......................... 375/316, 317, 375/355; 341/139

[56] References Cited

U.S. PATENT DOCUMENTS

| | | | |
|---|---|---|---|
| 4,887,299 | 12/1989 | Cummins et al. | 381/317 |
| 4,893,316 | 1/1990 | Janc et al. | 708/308 |
| 5,027,410 | 6/1991 | Williamson et al. | 381/320 |
| 5,251,216 | 10/1993 | Marshall et al. | 370/95.3 |
| 5,276,685 | 1/1994 | Kepler et al. | 370/95.3 |
| 5,422,643 | 6/1995 | Chu et al. | 341/139 |
| 5,590,156 | 12/1996 | Carney | 375/316 |

FOREIGN PATENT DOCUMENTS 604295 6/1994 European Pat. Off. .

*Primary Examiner*—Temesghen Ghebretinsae
*Assistant Examiner*—Kevin M Burd
*Attorney, Agent, or Firm*—Burns, Doane, Swecker & Mathis, L.L.P.

[57] ABSTRACT

A method of extending the dynamic range of a receiver in a digital radio transmission system, wherein the receiver receives a radio signal sent from a transmitter and includes an A/D-converter. Exemplary methods according to the present invention include the steps of selecting an upward limit value for the dynamic range of the A/D-converter, determining a minimum accepted signal quality for a radio signal process in the receiver, overextending the A/D-converter so as to exceed the upper limit value, generating a signal quality value downstream of the A/D-converter, comparing the generated signal quality value with the minimum accepted signal quality and limiting the overextension so that the minimum accepted signal quality will be exceeded when the A/D-converter is overextended.

5 Claims, 7 Drawing Sheets

METHOD AND ARRANGEMENT IN A TRANSMISSION SYSTEM

TECHNICAL FIELD

The present invention relates to a method and to an arrange- ment for extending the dynamic range of a signal receiver in a digital signal transmission system, i.e. for enhancing the ability of the receiver to reproduce correctly signals of different strengths.

BACKGROUND ART

In the transmission of signals between a transmitter and a receiver, such as voice signals, it is necessary for the receiver to have a certain dynamic range in order for the signals to be correctly reproduced. Signal strengths can vary markedly when received by the receiver, and a wide dynamic range contributes towards better signal reproduction in the receiver. For instance, U.S. Pat. No. 5,276,685 teaches a method of adapting the strength of an incoming signal to the receiver to the ability of the receiver to receive the signal, so-called automatic gain control. When the strength of the signal received by the receiver is greater than an upper limit value of the dynamic range of the receiver, the signal is attenuated. When the strength of the signal received by the receiver is beneath a lower limit value of the dynamic range of the receiver, the signal is amplified. One drawback with the method taught by the U.S. patent resides in the requirement of such complicated equipment in addition to the equipment normally available in the receiver. This additional equipment adds to the cost. Problems also occur when the strength of the received signal varies very abruptly. U.S. Pat. No. 4,893,316 teaches another method of extending the dynamic range. The patent describes dithering. By dithering is meant briefly the application of known noise to a signal which is too weak to be detected. The signal superimposes the noise. The signal can be detected by amplifying the total signal and filtering-out the known noise. The drawback with dithering lies in the requirement of components as dither generators and de-generators, which also add to the cost. The dynamic range can also be extended by extending the number of quantizing levels and using a 13-bit A/D-converter instead of a 12-bit converter. An increase in the number of bits results in more quantizing levels, which enables an extended dynamic range to be reproduced correctly. However, A/D-converters that have such extended properties also add to the costs and may be difficult to achieve.

DISCLOSURE OF THE INVENTION

A signal receiver of a digital system receives an analog signal after the signal has first passed through a certain analog signal processing stage. The signal is then digitalized so as to enable the digital information in the signal to be extracted. The problem relating to the dynamic range is solved by allowing an extended dynamic range over and above a normal limit value during the analog signal processing stage. The amplitude of the signal is then restricted in the digitalizing process. This digitalized signal contains amplitude information that would have been lost if the signal had already been restricted in the analog signal processing stage. The present invention also relates to an arrangement for implementing the aforesaid method.

A prime object of the present invention is to obtain amplitude information from the signal even when the signal is stronger than said limit value.

Another object is to enhance the transmission of information when the transmitted signal is subjected to serious disturbances and interference.

A further object is to improve signal processing in a receiver-mounted equalizer.

The aforesaid analog signal processing stage involves restricting the amplitude of the received signal in accordance with the extended dynamic range and filtering the signal through a low-pass filter. When signal transmission takes place on a high-carrier frequency, the signal processing stage is preceded by mixing down a received high-frequency signal with a synthesizing frequency so as to obtain an intermediate frequency signal. The low-pass filtered signal is applied to an analog/digital converter, which is overextended by the low-pass filtered signal. The signal is down-mixed in a further stage downstream of the analog/digital converter to obtain a baseband signal which is divided into a real and an imaginary part. The amplitude of each of these two signals is restricted and the pair of signals contain the digital information to be transmitted. Despite the amplitude limitation that results from overextending the analog/digital converter, the real and the imaginary signal together contain certain amplitude information up to an amplitude value that corresponds to the analog amplitude limitation. Overextending the analog/digital converter generates digital harmonics and a phase error, although the phase error has relatively small effect on the continued processing of the signal.

One advantage afforded by the invention is that certain amplitude information can be obtained from the received signal even in the case of signals whose amplitudes have been limited.

Another advantage is that existing signal receivers can be used without requiring complicated modification to or restructuring of the receivers.

BEST MODE OF CARRYING OUT THE INVENTION

Figure 1:
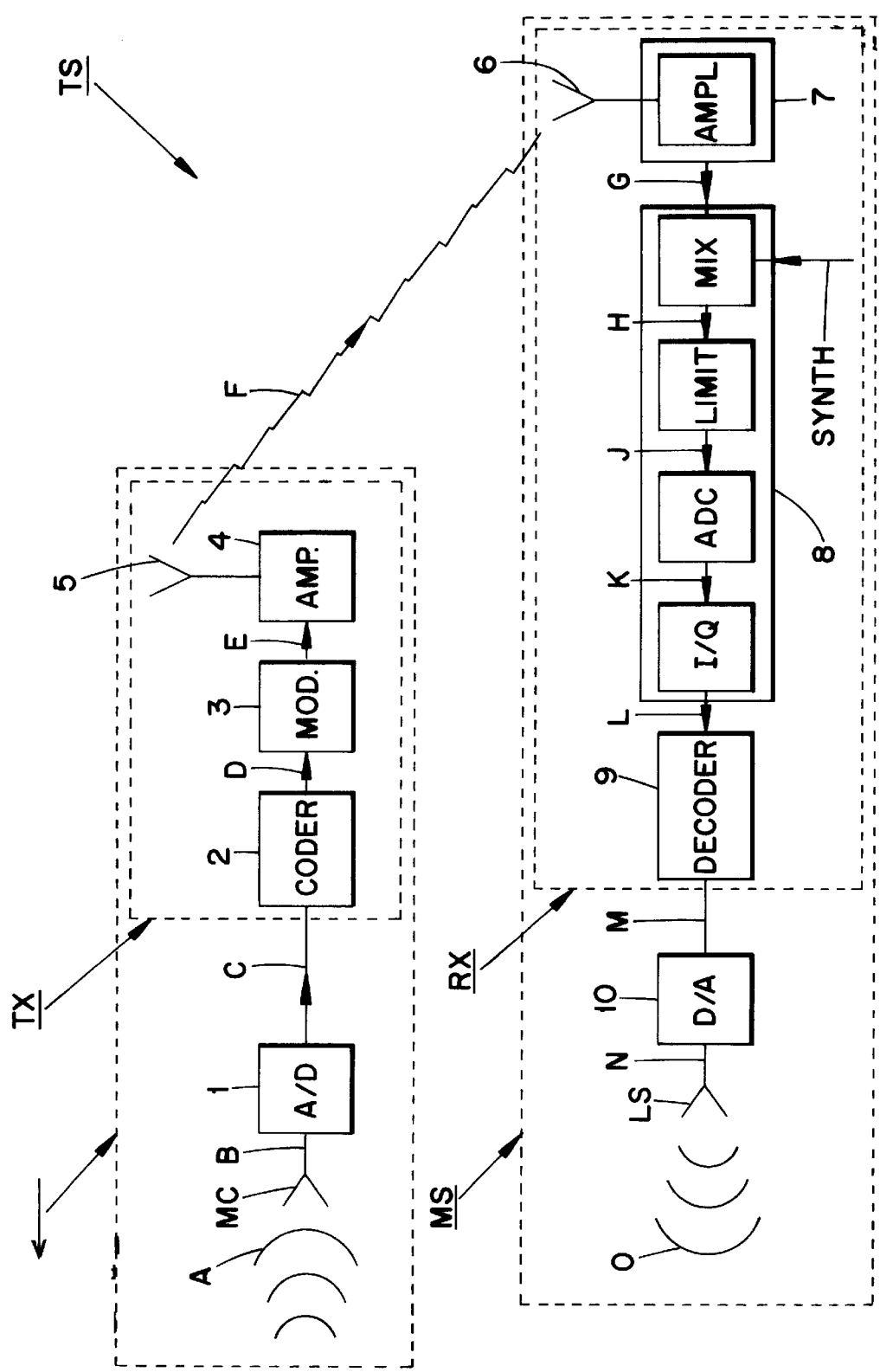
FIG. 1 illustrates schematically a block diagram of a transmission system which includes a transmitter and a receiver.

FIG. 1 is an overview of a transmission system TS in a mobile telephone system of the GSM kind (Global System for Mobile Communication). In the illustrated embodiment, the transmission system TS includes a transmitter TX in a base station in a public land mobile network PLMN, and a receiver RX in a mobile station MS. In the illustrated case, the transmitter has been placed in the base station and the receiver in the mobile station, although the reverse may be the case. Only those components that are most essential to the invention have been shown in FIG. 1, and the Figure does not claim to illustrate a transmission system TS in detail. A microphone MC housed in a telephone unit is connected to a primary A/D-converter 1 in the public land mobile network PLMN. The primary A/D-converter 1 is connected to a coder 2 in the transmitter TX in the base station. In the illustrated case, the coder 2 includes a channel coder and an interleaver. Several other types of coding are conceivable, for instance speech coding and encryption. The coder 2 will be explained in more detail further on and is used mainly to generate a redundant signal, i.e. a signal which is more resistant when transmitted from the transmitter TX to the receiver RX than the original signal. The coder 2 is connected to a modulator 3 which generates from an incoming signal a phase-modulated analog carrier wave having a connection-selected carrier frequency. The modulator 3 is connected to a transmitter amplifier 4, which is connected to a transmitter antenna 5. The receiver RX in the mobile station MS includes a receiver antenna 6 which is connected to a receiver amplifier 7.

The receiver amplifier 7 includes a signal amplifier AMPL which adapts signal strength to following components and compensates for power losses. The receiver amplifier 7 is connected to a demodulator 8. The demodulator 8 includes a frequency mixer MIX which extracts a signal of predetermined frequency from information received from the air interface between the transmitter TX and the receiver RX. The frequency mixer MIX is connected to a signal limiter LIMIT, which limits the strength of incoming signals. The signal limiter LIMIT is connected to an A/D-converter ADC which converts the extracted signal from analog to digital form. The A/D-converter ADC is connected to a quadrature divider I/Q. The function of the A/D-converter ADC and the quadrature divider I/Q are highly significant to the concept of the invention and will be explained in more detail further on. The demodulator 8 is connected to a decoder 9. The decoder 9 is connected to a D/A-converter 10 in the mobile station MS. The D/A-converter 10 is connected to a loudspeaker LS.

Figure 2A:
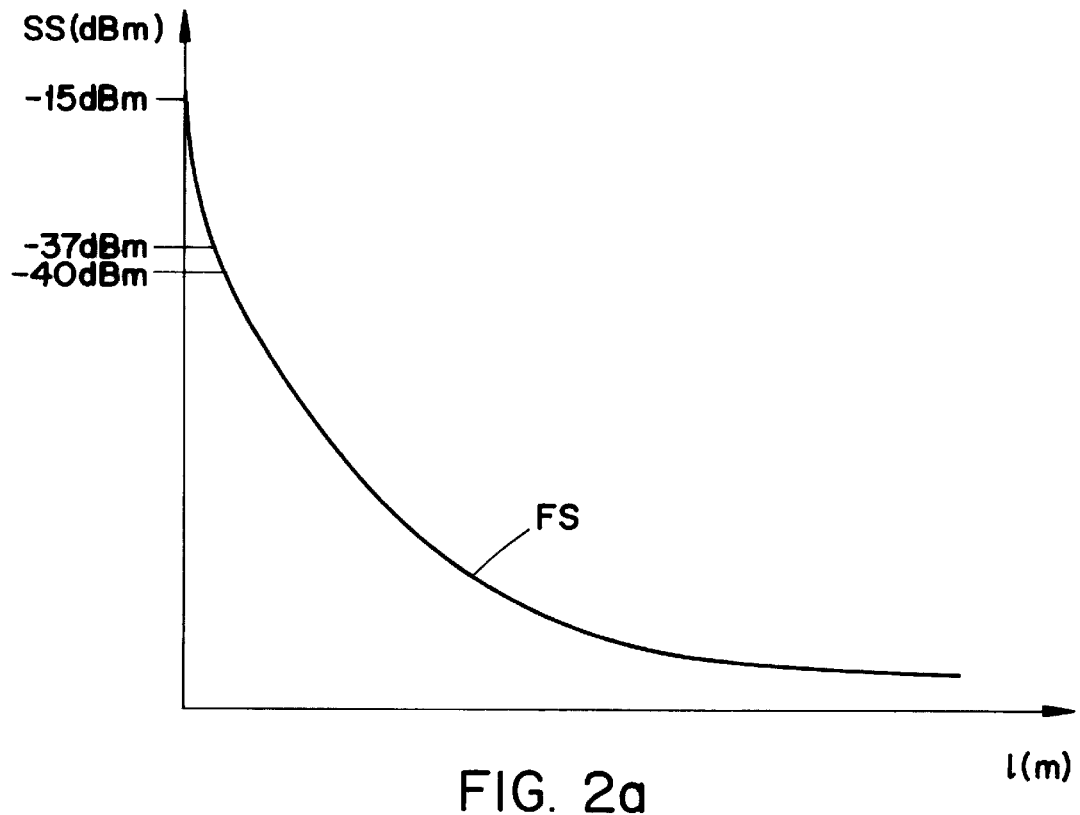
FIGS. 2a and 2b are signal strength diagrams which show the strength of the signal received in the receiver.

FIG. 2a is a diagram in which the ordinate represents a signal strength [SS] expressed in decibels in relation to a reference level lmW [dBm], and the abscissa represents the length [l] i meters [m]. The length l=0 meter corresponds to the position of the base station. A full-line power curve FS corresponds to the strength of a signal transmitted from the transmitter TX and received in the receiver RX. The strength of the signal is thus greatest when the mobile is located in the vicinity of the base station, and becomes weaker with increasing distances of the mobile from the base station. FIG. 2a will be explained in more detail further on.

Figure 2B:
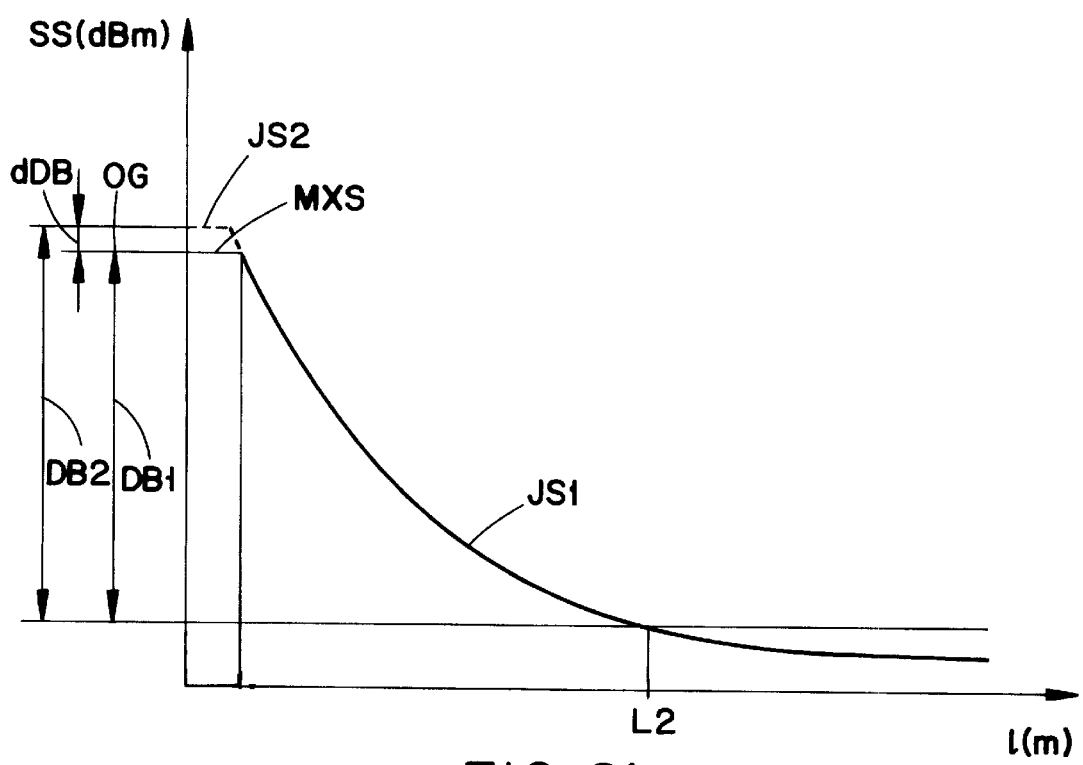

Similar to FIG. 2b, FIG. 2b is a diagram in which the ordinate represents signal strength [SS] expressed in decibels relative to a reference level lmW [dBm] and the abscissa represents length [l] in meters [m]. The length l=0 meter corresponds to the position of the base station. A full-line power curve JS1 corresponds to the strength of the signal received by the mobile station MS in the A/D-converter ADC subsequent to the signal being processed in the receiver amplifier 7. FIG. 2b will be described in more detail further on.

Signal processing in the case of speech information transmissions will now be explained, wherein signal processing is described when speech information is transported from the microphone MC to the loudspeaker LS via the radio transmitter TX and the radio receiver RX, all in accordance with present-day known techniques. A method of processing signals in the receiver RX in accordance with the invention will be described further on. The stages that are most important to the invention will be particularly illustrated and the effects achieved by the invention explained in more detail.

The method of processing signals in the transmission of speech information includes the following steps:

A voice signal A from a user is converted to an analog signal B in the microphone MC.

The analog signal B is converted to a pulse-code modulated signal, a so-called PCM-signal C, in the public land mobile network PLMN. The PCM-signal C is transferred to the transmitter TX in the base station, via a PCM-link. The signal is transmitted at a rate of 64 kbit/s.

The PCM-signal C is coded in the coder 2 in the transmitter TX. As before mentioned, the coder 2 includes a channel coder and an interleaver. It can be mentioned briefly that the channel coder multiplicates the information in the PCM-signal so as to obtain redundancy in the transmitted signal. This redundancy enables errors that occur in the transmission from the transmitter TX to the receiver RX to be detected more readily. If the values of single bits are changed during the transmission, the redundant transmission enables the original signal to be regenerated more readily. The interleaver distributes bits so that bits which are mutually sequential upstream of the interleaver are separated and spread-out from one another in the interleaver. Air-carried interferences between the transmitter TX and the receiver RX often occur in bursts. The total loss of coherent information can be prevented by spreading-out the information with the aid of the interleaver. The functions of the channel coder and the interleaver are well known to the person skilled in this particular art and will not therefore be explained in more detail. The coder 2 generates a digital baseband signal D. As a result of channel coding and interleaving, the baseband signal is more resistant than the original PCM-signal C in the transmission from the transmitter TX to the receiver RX.

Figure 3:
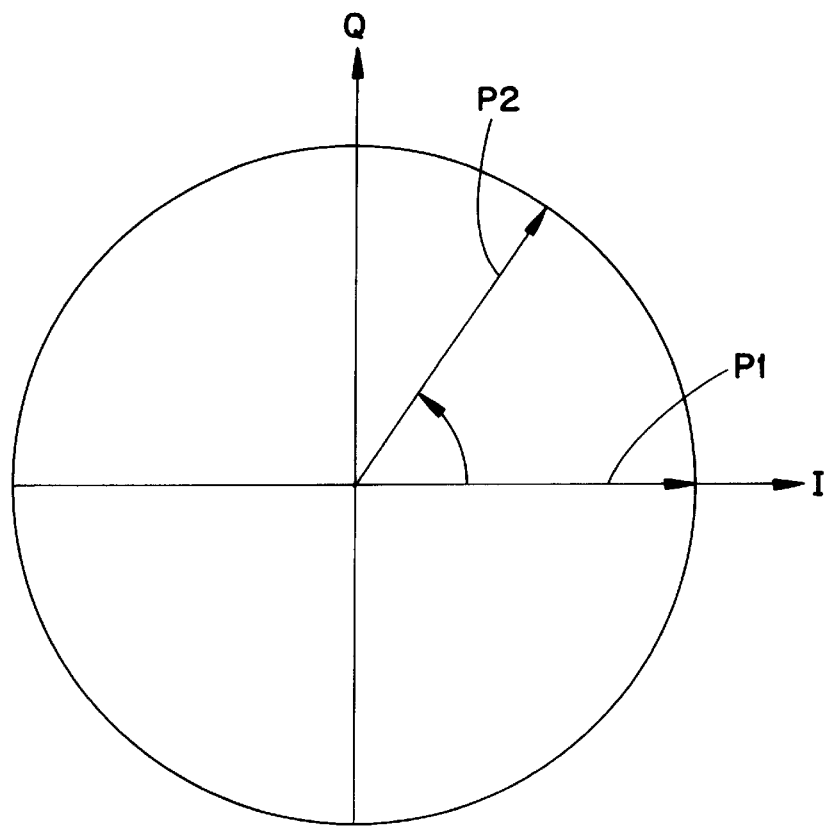
FIG. 3 is an I/Q-diagram illustrating the principle of GMSK modulation.

The baseband signal D is sent to the modulator 3 and there converted to an analog phase-modulated carrier wave E. This modulation is effected in accordance with the GMSK-method (Gaussian Minimum Shift Keying), which is a modulating method that permits a relatively narrow bandwidth. Briefly, modulation in accordance with the GMSK-method involves bits in the baseband signal D representing a certain phase position of the generated carrier wave E. FIG. 3 shows with the aid of an I/Q-diagram how the phase position of the carrier wave E is changed from a first position P1 to a second position P2 when the modulator receives a new bit from the baseband signal D. GMSK-modulation is a modulation technique commonly used in the field of telecommunications and is known to the person skilled in this technical field. The phase position of the carrier wave E thus varies in accordance with the information contained in the baseband signal D. The amplitude of the carrier wave E is constant and the carrier frequency chosen in accordance with the GSM-specifications is also constant and in the illustrated example has been chosen at 900.2 MHz.

A maximum received signal strength is determined in accordance with a predefined value in the system specification of the GSM-system. According to the illustrated example, the maximum signal strength SS is −15 dBM, as shown in FIG. 2a.

The carrier wave E is forwarded to the transmitter amplifier 4 and converted to a radio signal F, and then transmitted at the chosen signal strength via the transmitter antenna 5.

There is established a minimum accepted signal quality specified in the system requirements, after processing the signal in the receiver. The system requirements are specified in the GSM-specifications.

The reference voltage of the A/D-converter ADC is selected.

This selection is made in accordance with a desired spacing between the maximum and minimum amplitude of a signal incoming to the A/D-converter. In the case of the illustrated embodiment, the maximum amplitude of received signals corresponds to +1 Volt. At 50 ohms, +1 Volt corresponds to a signal strength $$SS = \frac{U^2}{R} + 30 \text{ [dBm]} = +10 \text{ dBm.}$$

The signal strength +10 dBm is shown in FIG. 2b with an upper limit value OG for the A/D-converter ADC.

Selection of a number of quantizing levels with regard to the A/D-converter ADC. In the case of the illustrated embodiment, the quantizing levels are 4095 in number, since a 12-bit A/D-converter has been selected to implement the A/D-converter ADC. The choice is made in accordance with the dynamics desired in the A/D-converter ADC.

The radio signal F is received via the receiver antenna 6 and transported from the antenna 6 to the receiver amplifier 7. The received total radio signal includes a plurality of other frequencies in addition to the frequency of 900.2 MHz transmitted from the transmitter TX. The total received radio signal F is amplified in the signal amplifier AMPL. Because the maximum signal strength SS is −40 dBM in accordance with GSM-specifications, an amplification of 50 dB is required to attain the selected upper limit value OG of +10 dBm in the A/D-converter ADC (−40 dBm plus 50 dB=+10 dBm). The 50 dB amplification is therewith adapted so that the radio signal will be amplified without exceeding the earlier mentioned upper limit OG of the selected A/D-converter ADC. Subsequent to amplification in the receiver amplifier 7, a maximum signal strength must be below the upper limit value OG if the A/D-converter is not to be overextended. The total received amplified signal F is referred to as a front signal G.

The front signal G is sent from the receiver amplifier 7 to the frequency mixer MIX in the demodulator 8. As previously mentioned, the front signal G includes frequencies that are additional to the frequency transmitted from the transmitter TX, i.e. 900.2 MHz. A desired so-called first intermediate frequency H of 75 MHz can be obtained by mixing the front signal G with a so-called synthesized frequency SYNTH of 825.2 MHz (the intermediate frequency of 75 MHz corresponding to (900.2 minus 825.2). The reason for choosing the synthetic frequency SYNTH, and therewith the intermediate frequency corresponding to 75 MHz, is chosen because filters in the receiver RX are dimensioned for a selected first intermediate frequency H corresponding to 75 MHz. The function of the frequency mixer MIX is well known to the person skilled in the telecommunications field and will not therefore be described in detail.

Figure 4:
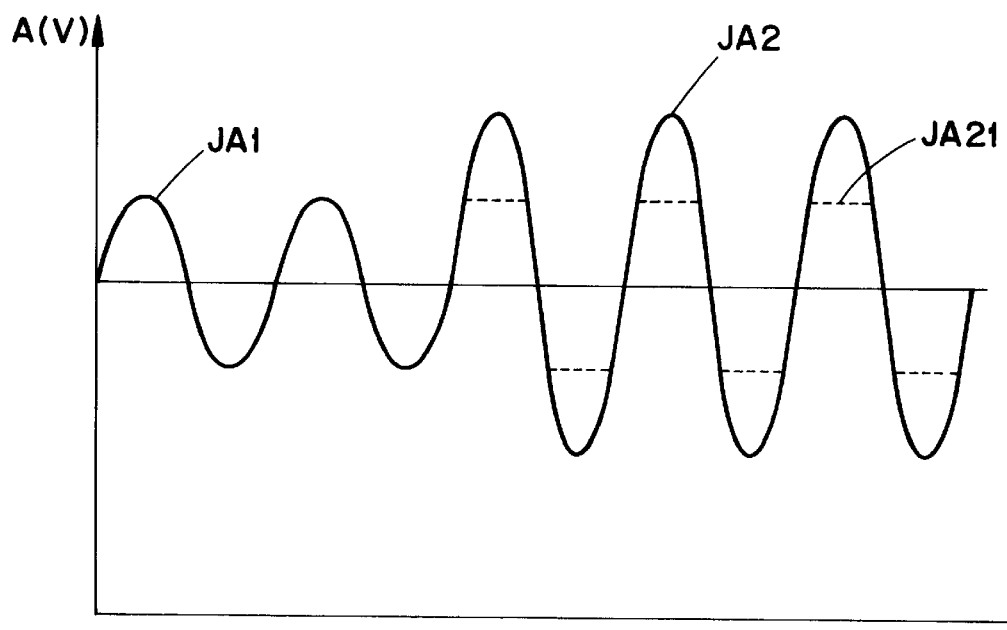
FIG. 4 is an amplitude diagram showing the amplitude of the received signal when the receiver is located close to the transmitter.

The first intermediate frequency H is sent from the frequency mixer MIX to the signal limiter LIMIT. The signal limiter LIMIT prevents further transportation in the receiver RX of signals whose strengths are above −40 dBm. FIG. 2a shows that the received signal is limited when the mobile is in the vicinity of the base station, according to the GSM-specification when the signal strength exceeds −40 dBm. Undesirable frequency components that result from this signal limitation are filtered-out in the signal limiter LIMIT. The signal limited and filtered in the signal limiter LIMIT is referred to as a limited intermediate frequency J. The signal strength SS for the limited intermediate frequency J is shown in FIG. 2b with the aid of a full-line power curve JS1. As before mentioned, the position of the base station is symbolized in FIG. 2b by the ordinate. The upper part of the full-line power curve JS1 shows signal strength in the limited intermediate frequency when the mobile station MS is located in the vicinity of the base station. The signal strength, which decreases with length l symbolizes the signal strength at the input of the A/D-converter ADC as the mobile moves away from the base station. The selected A/D-converter ADC is able to convert the limited intermediate frequency from an analog to a digital form provided that the mobile is located between l=L0 and l=L2. When the mobile is located between l=L0 and l=L1, the strength of the signals received by the antenna is greater than −40 dBm and the maximum signal strength MXS is received in the A/D-converter. The maximum signal strength MXS is then reproduced in the A/D-converter with the highest quantization level, i.e. the twelve bits in the A/D-converter exhibit the quantization level #4095. A minimum receivable signal strength can be regenerated in the A/D-converter when the mobile is located at length (distance) l=L2. The signal strength then corresponds to a so-called lower limit value UG. The signal strength at the lower limit value UG is regenerated in the A/D-converter with the lowest quantization level, i.e. the twelve bits in the A/D-converter exhibit quantization level #0. FIG. 4 is an amplitude diagram in which the amplitude of the limited intermediate frequency J as a function of time is shown with a full-line amplitude curve JA1. The amplitude curve JA1 shows the amplitude of the intermediate frequency J when the signal strength SS of the intermediate frequency is in the proximity of maximum signal strength, i.e. when the mobile station is located in the vicinity of the base station. The ordinate in the amplitude diagram shown in FIG. 4 symbolizes amplitude [A] in volts [V], and the abscissa symbolizes time [t] in seconds [s]. The full-line amplitude curve JA1 shows that part of the intermediate frequency J which can be regenerated in the A/D-converter ADC. Since in accordance with known techniques the upper limit value OG of the A/D-converter ADC is not exceeded when receiving maximum signal strength MXS in the A/D-converter, the intermediate frequency J in the vicinity of the maximum signal strength MXS can be regenerated fully in the A/D-converter. As will be seen from FIG. 4, the intermediate frequency J is therewith regenerated without the peak values of the amplitude being "clipped" by virtue of overextension by the A/D-converter ADC. The limited intermediate frequency J processed in the A/D-converter ADC is referred to as a digitalized first intermediate frequency, a so-called digital frequency K.

Figure 5:
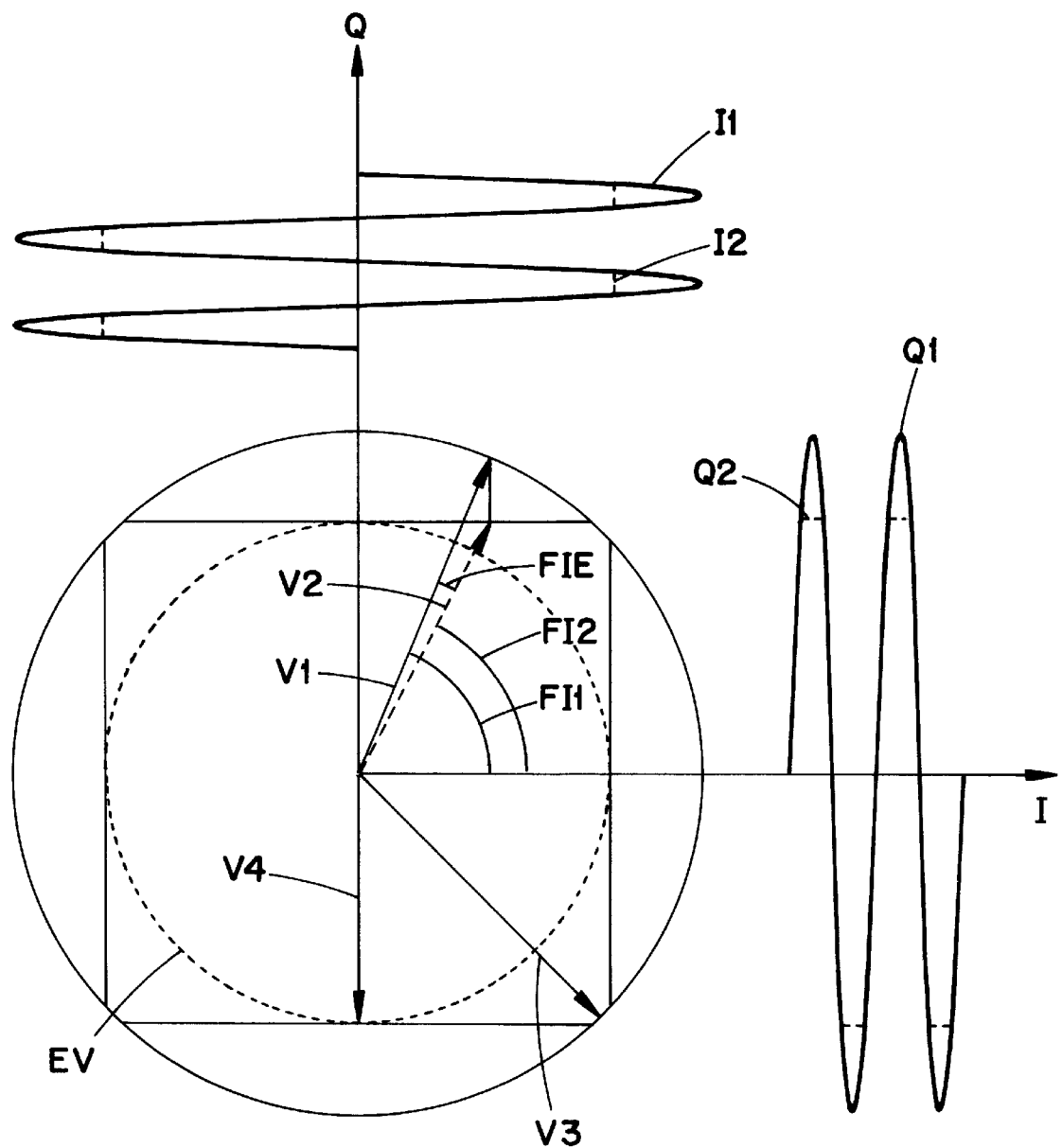
FIG. 5 is an I/Q-diagram showing the principle of GMSK demodulation.

The digital frequency K is sent from the A/D-converter ADC to the quadrature divider I/Q, as shown in FIG. 1. The digitalized signal K includes a multiple of frequency components on both sides of the digital intermediate frequency. A folding effect occurs when the intermediate frequency is mixed down to zero frequency, i.e. those frequency components that are theoretically located in the negative frequency range are folded down in practice over the zero axis to the positive frequency range. A real part of the signal is obtained, by mixing the resultant frequency components with a sine signal. An imaginary part of the signal is obtained, by mixing the resultant frequency components with a cosine signal. The signal obtained by mixing the resultant frequency components with the sine signal is referred to as an I-component and the signal obtained by mixing said resultant frequency components with the cosine signal is referred to as a Q-component. The two signal components obtained can be represented in a so-called I/Q-diagram, shown in FIG. 5. FIG. 5 shows the I-component with a first full-line curve I1, the value of which is read-off on the I-axis, and shows the Q-component with a second full-line curve Q1, the value of which is read-off on the Q-axis. By permitting the two components together to form a vector V1, the envelope of the original baseband signal, i.e. the maximum amplitude of the baseband signal in each period, can be regenerated by reading-off the amplitude of the vector V1. The envelope is used by an equalizer in the decoder 9 in a later method stage. Phase-displacement FI1 of the vector V1 is used to regenerate the bit information in the original baseband signal, in accordance with the aforesaid GMSK-principle described above with reference to FIG. 3. A predetermined instantaneous phase-shift FI1 corresponds to a predetermined value of a bit interval in the baseband signal. The quadrature divider I/Q thus regenerate an ideal case from the digital frequency K, the original baseband signal D which entered the modulator 3 in the transmitter TX earlier on in the process. The regenerated baseband signal is referred to as a resultant baseband signal L. Quadrature division mentioned briefly in the aforegoing is known to the person skilled in the radio communications field and will not therefore be described in detail.

The resultant baseband signal L is sent from the quadrature divider I/Q in the demodulator 8 to the decoder 9. The decoder regenerates from the resultant baseband signal L the PCM-signal C incoming to the coder 2 at an earlier process stage. The resultant baseband signal L is processed in the aforesaid equalizer in the decoder 9. The envelope earlier illustrated with the aid of the I/Q-diagram in FIG. 5 is used in the equalizer to separate the signal component in the radio signal F that has been received directly from the transmitter TX to the receiver RX from the signal components in the radio signal F that have not been received in the receiver RX until after reflection. The PCM-signal regenerated subsequent to the channel decoding, de-interleaving and equalizing processes is referred to as a resultant PCM-signal M.

The resultant PCM-signal M is sent from the decoder 9 to the D/A-converter 10. The D/A-converter regenerates from the PCM-signal the analog signal B arriving at the A/D-converter 1 at an earlier stage. The regenerated signal is referred to as a resultant analog signal N.

The resultant analog signal N is sent from the D/A-converter 10 to the loudspeaker LS. The speech signal A incoming to the microphone at an earlier stage is regenerated in the loudspeaker LS. The regenerated speech signal is referred to as a resultant speech signal O.

A method of extending the dynamic range of a signal receiver in accordance with the invention will now be described. The aforedescribed method steps effected in the transmitter TX are the same as those carried out when practicing the invention. When practicing the invention, the signal is changed in the receiver RX. This change will be illustrated with reference to FIGS. 2, 4 and 5. In an endeavour to clarify the description, the names or designations given to the signals in the description and the reference signs shown in FIG. 1 will be kept the same as those used above. On the other hand, the contents of the earlier-named signals will be changed when carrying out the invention. This change is shown in FIGS. 2b, 4 and 5 with the aid of broken-line signal regenerations in the various diagrams.

The inventive method is thus concerned solely with the receiver RX and includes the following steps:

The establishment of the minimum accepted signal quality, the selection of the A/D-converter reference voltage and the number of quantization levels are the same as those earlier described.

The radio signal F is received via the receiver antenna 6 and then transported from the antenna 6 to the receiver amplifier 7.

The received total radio signal F is received in the signal amplifier AMPL. The signal is amplified to 50 dB, as in the earlier case.

The front signal G is sent from the receiver amplifier 7 to the frequency mixer MIX in the demodulator 8. As before described, the first intermediate frequency signal H is obtained by mixing-down the front signal G.

The first intermediate frequency signal H is sent from the frequency mixer MIX to the signal limiter LIMIT in the receiver amplifier 7. According to the invention, the signal limiter prevents further transportation in the receiver RX of signals whose signal strengths are above −37 dBm. Signals whose signal strengths exceed the earlier permitted signal strength by up to 3 dB are thus allowed to pass. FIG. 2a shows that the received signal is limited when the mobile is located in the vicinity of the base station, in accordance with the embodiment where the signal strength exceeds −37 dBm. The extra signal strength obtained therewith is utilized in the equalizer when evaluating the envelope of the signal. The possibility of also receiving signal strengths above −40 dBm in the equalizer is highly significant, particularly in the case of complicated transmission conditions. It is true that the A/D-converter will be overextended as a result of the elevated signal strength, but the information obtained in spite of this overextension the A/D-converter will be sufficient to marginally meet performance requirements.

This will be made apparent further on in the text. The undesirable frequency components that have risen as a result of this signal limitation are then filtered-off in the signal limiter LIMIT. The signal strength SS of the limited intermediate frequency J is shown in FIG. 2b with the aid of a broken-line power curve JS2. The broken-line power curve JS2 shows the signal strength in the limited intermediate frequency J when the mobile station MS is located in the vicinity of the base station.

When the mobile is located between l=L0 and l=L1, the signal will be distorted in the A/D-converter due to the earlier mentioned overextension of the converter when the upper limit value OG of the A/D-converter ADC is exceeded. However, the effect of this distortion can be overcome in a digital system as will be apparent from the following description. FIG. 4 shows the amplitude of the limited intermediate frequency J with the aid of an amplitude curve JA2 whose amplitude is higher than the amplitude in the earlier shown amplitude curve JA1 as a result of the aforesaid reduced limitation of the radio signal F. The amplitude curve JA2 shows the amplitude of the intermediate frequency J when the mobile station is located in the vicinity of l=L0. The broken part JA21 of the amplitude curve JA2 shows the level of the intermediate frequency J that can be regenerated in the A/D-converter ADC. Since the upper limit value OG of the A/D-converter ADC is exceeded when receiving the maximum signal strength of the intermediate frequency, the intermediate frequency J cannot be regenerated correctly in the A/D-converter. The signal is distorted because the peak amplitude values are "clipped" as a result of overextending the A/D-converter ADC. This "clipping" is evident from the broken parts JA21 in FIG. 4.

The digital frequency K, i.e. the limited intermediate frequency J processed in the A/D-converter, is sent from the A/D-converter ADC to the quadrature divider I/Q. Both of the signal components obtained are represented in the I/Q-diagram shown in FIG. 5. A first broken-line curve I2 in FIG. 5 shows clipping of the I-component in accordance with the inventive method, while a second broken-line curve Q1 shows clipping of the Q-component. The two components shown in FIG. 5 together form a broken-line vector V2. Because the two components have been formed from the digital frequency K distorted in the A/D-converter, the amplitudes of the two components are "clipped" at its peaks. This means that the vector V2 will at times be shorter than would be the case if the vector had been created from a non-distorted intermediate frequency. The length of a third vector V3 in FIG. 5 represents the envelope value of the received signal at the relevant phase position of the vector V3. The length of a fourth vector V4 represents the envelope value of the received signal at the relevant phase position of the vector V4. The envelope value of the third vector V3 is the same as though the A/D-converter were not overextended when receiving a signal strength corresponding to −37 dBm, i.e. the shown envelope value is correct. The envelope value of the fourth vector V4 is the same as though the A/D-converter was overextended to a maximum when receiving a signal strength corresponding to −37 dBm, i.e. the given envelope value is maximally wrong. By way of comparison, it can be mentioned that if the A/D-converter is not overextended when receiving a signal strength corresponding to −40 dBm, as in the case of the exemplifying embodiment first described, the amplitude will be constant and follow the inner circle EV dotted in FIG. 5. By overextending the A/D-converter ADC, certain amplitude information is obtained when receiving signal strengths corresponding to −37 dBm. Although the amplitude information is not complete, it is better than the amplitude information that would be obtained if the A/D-converter ADC were not to be overextended, i.e. when receiving a signal strength which is limited to −40 dBm. As previously mentioned, the phase-shift FI2 of the vector V1 is used to regenerate the bit information of the original baseband signal D. A predetermined instantaneous phase-shift FI2 corresponds to a predetermined value of a bit interval in the baseband signal. Since the vector V2 is shorter than the earlier mentioned vector V1 created from a non-distorted intermediate frequency, a phase error FIE has occurred in addition to the earlier mentioned clipped amplitudes. The phase error has been shown in FIG. 5. The phase error can be calculated with the following formula: FIE=FI1−FI2=FI1−90+arctan(X * cos FI1). In the formula, X corresponds to the overextension factor by which the A/D-converter is overextended. In digital systems, for instance the GSM-system, there is a largest tolerated phase error. In the case of the GSM-system, an overextension factor of 1.4 times will generate a phase error FIE of six degrees. A phase error FIE corresponding to six degrees is acceptable in a GSM-system. Provided that the phase error FIE is smaller than the tolerated error, the amount of correctly regenerated bit information will be acceptably high.

With an overextension factor corresponding to 1.4 times, the signal quality will also be acceptably high because the effect of overtones will not be sufficiently disturbing to create problems in the detection of the signal. The effect of the harmonics is made apparent further on in conjunction with the description of FIG. 7.

Figure 6:
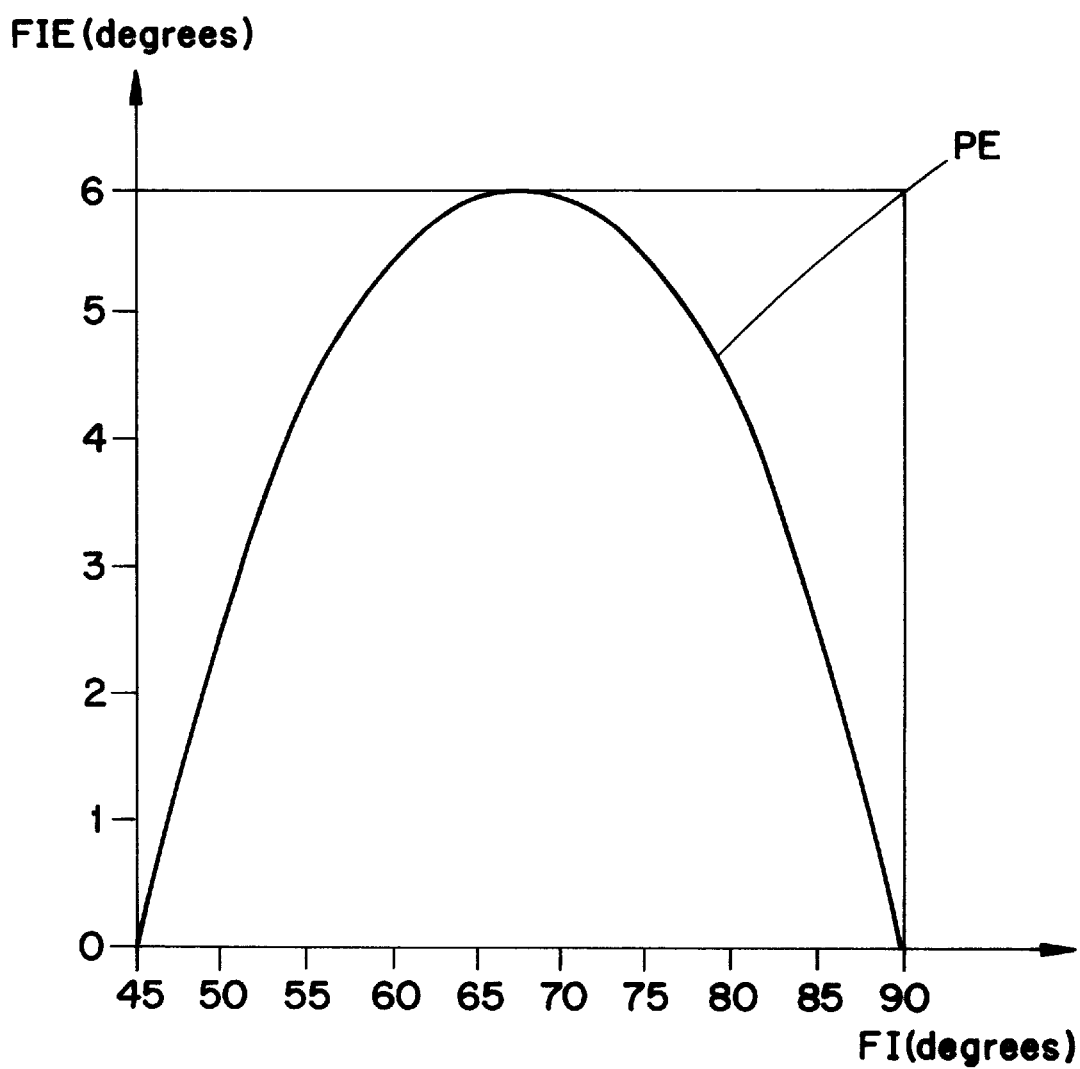
FIG. 6 is a phase diagram showing the phase error when over modulating the receiver.

FIG. 6 illustrates a phase error value measured in the GSM-system as a function of the phase shift when overextending the A/D-converter by a factor of 1.4, corresponding to 3 dB. The abscissa shows the phase shift FI in degrees and the ordinate shows the phase error FIE also in degrees. Of the total possible phase shift (0–360 degrees) only a part (45–90 degrees) has been shown in the Figure. FIG. 6 shows that a maximum phase error corresponding to six degrees occurs in the GSM-system at the selected overextension. A phase error corresponding to six degrees is acceptable in a GSM-system. However, the mean error value is much lower. This enables the tange of the A/D-converter to be extended by 3 dB be effected in the absence of disturbing influences on the part of a system user.

Figure 7:
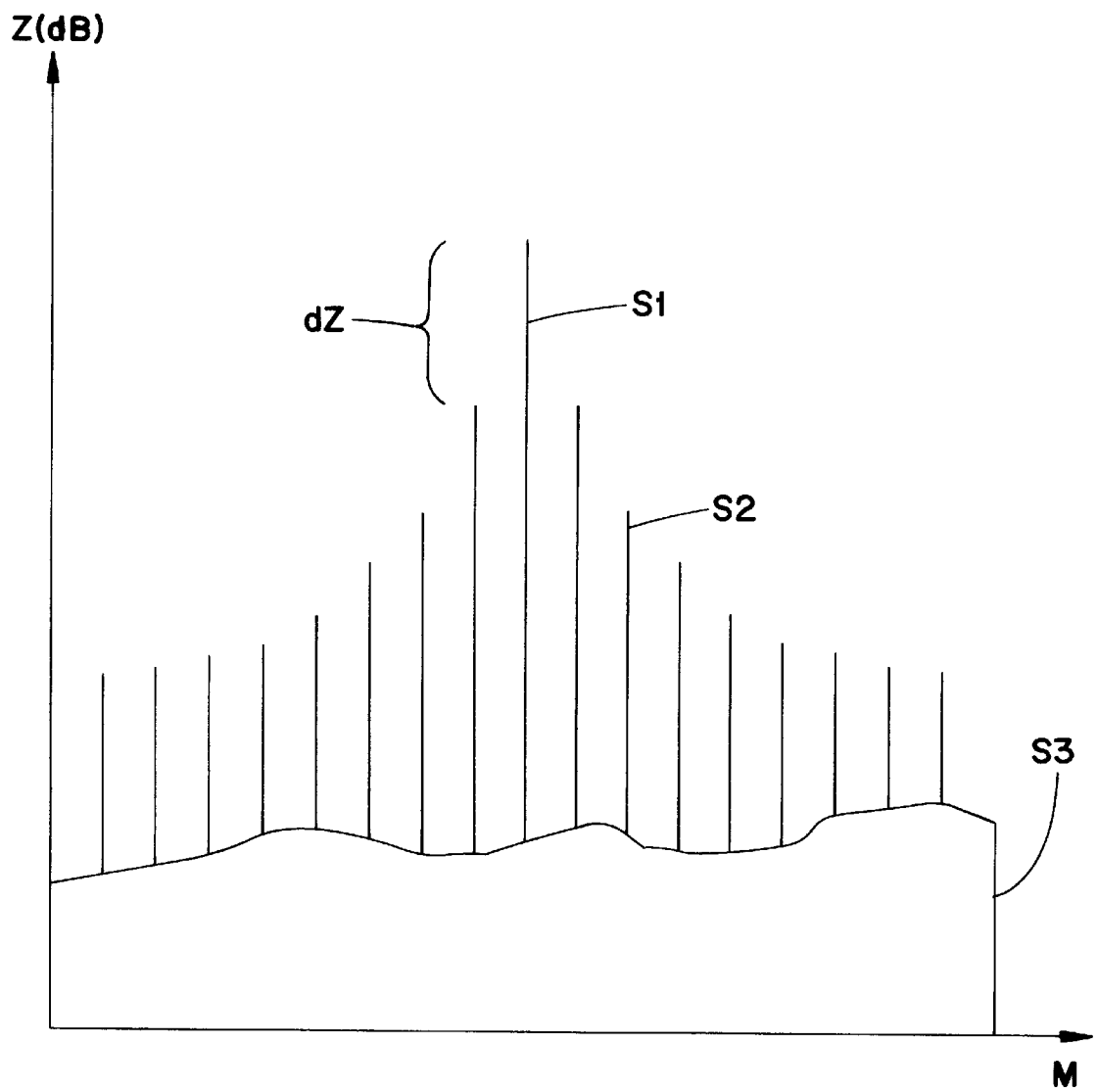
FIG. 7 is a frequency diagram showing different frequency components that occur when overextending the receiver.

FIG. 7 illustrates the configuration of the clipped amplitude curve JA2 shown in FIG. 4 when measuring the signal in the frequency plane. The abscissa M shows frequency and the ordinate Z shows signal strength in dB. The fundamental frequency of the digital frequency K is shown with a first frequency stack S1. Harmonics, which occur after "clipping" in the A/D-converter ADC, are shown with separate frequency stacks S2 at lower levels than the fundamental frequency. The so-called noise mat is shown in FIG. 7 by a darkened region S3. The received fundamental frequency is acceptable provided that a certain ratio dZ prevails between the power in S1 and the power in the noise mat S3 and the harmonics S2.

In summary, it can be mentioned that the dynamic range of the receiver is extended with the aid of the invention. Although certain information is obtained when extending the dynamic range by an amount corresponding to 3 dB, this information is not complete. The extended envelope information obtained is used in the equalizer when the receiver is located in terrain that is particularly unfavourable to reception.

Figure 8:
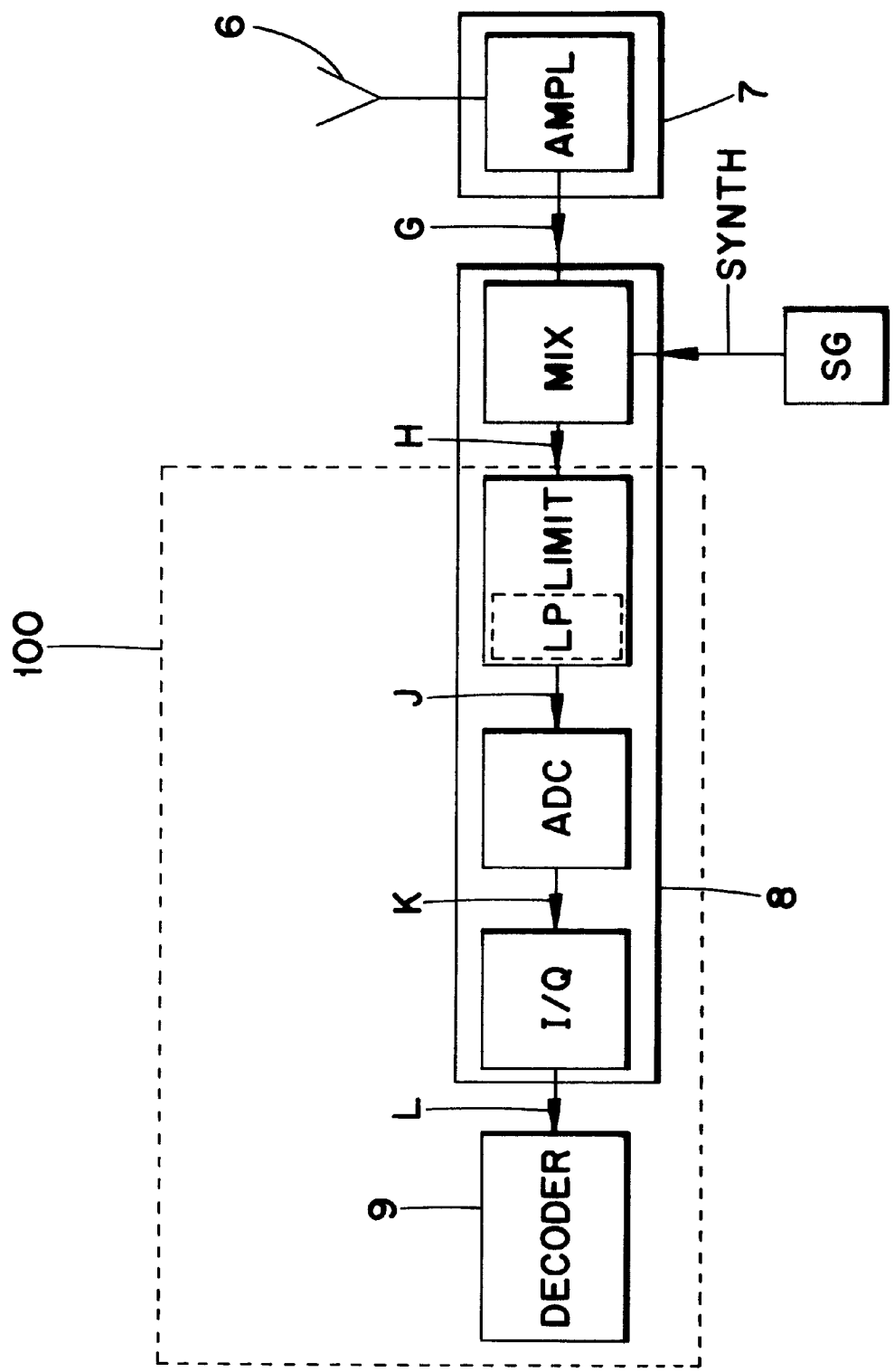
FIG. 8 is a block schematic illustrating an inventive arrangement.

FIG. 8 illustrates an inventive device 100 in the receiver RX. The device includes the signal limiter LIMIT, the A/D-converter ADC, which is connected to the signal limiter LIMIT, and a detector connected to the A/D-converter. The device 100 is connected via the frequency mixer MIX and the signal amplifier AMPL to a receiver antenna 6 to which a radio signal (F) is applied. The Figure also shows a synthetic frequency generator SG connected to the frequency mixer MIX. The signal limiter LIMIT is shown to include a low-pass filter LP which functions to filter-out those harmonics that occur in the signal limiter. The A/D-converter has a dynamic range whose upper limit corresponds to the aforesaid upper limit value OG. The detector includes the quadrature divider I/Q and the decoder 9. The quadrature divider I/Q includes means for restructuring the signal so as to enable it to be processed in the decoder 9, in which a measurement of signal quality can be detected.

The signal limiter LIMIT includes means for limiting the radio signal F processed in the signal amplifier AMPL and the frequency mixer MIX. In this regard, the signal limiter LIMIT limits the signal so that the upper limit value OG will be exceeded and so that the signal quality detected in the detector will exceed a predetermined minimum acceptable limit value.

It will be understood that the invention is not restricted to the aforedescribed and illustrated exemplifying embodiments thereof and that modifications can be made within the concept of the invention. For instance, the radio signal may be sent from the mobile and received in the base station. Furthermore, the invention can be applied in systems other than the aforesaid GSM-system. The invention is thus not restricted to the described and illustrated embodiments since modifications can be made within the scope of the following claims.

We claim:

1. A method of extending the dynamic range of a receiver in a digital radio transmission system, wherein the receiver receives a radio signal sent from a transmitter and includes an A/D-converter, and wherein the method comprises the following steps:

selecting an upper limit value for the dynamic range of the A/D-converter;

determining a minimum accepted signal quality for a radio signal process in the receiver;

overextending the range of the A/D-converter so as to exceed the upper limit value;

generating a signal quality value downstream of the A/D-converter;

comparing the generated signal quality value with the minimum accepted signal quality;

limiting overextension of the A/D-converter so that the minimum accepted signal quality will be exceeded when the A/D-converter is overextended;

down-mixing an output of the A/D-converter to obtain a baseband signal; and mixing the baseband signal partly with a sine signal and partly with a cosine signal to enable the mixed signal to be analyzed in a decoder.

2. A method of extending the dynamic range of a receiver in a digital radio transmission system in accordance with claim 1, wherein the receiver includes a signal limiter to which the A/D-converter is connected, and wherein the method comprises the following steps:

limiting the signal incoming to the signal limiter in said signal limiter so that the signal strength will exceed the upper limit value of the A/D-converter; and filtering the signal limited by the signal limiter in said limiter with the aid of a low-pass filter.

3. A method of extending the dynamic range of a receiver in a digital radio transmission system in accordance with claim 1, wherein the method includes the further step of overextending the A/D-converter such as to exceed the upper limit value by a factor of 1.4.

4. A method of extending the dynamic range of a receiver in a digital radio transmission system in accordance with claim 2, wherein the method includes the further step of overextending the A/D-converter such as to exceed the upper limit value by a factor of 1.4.

5. A device for extending the dynamic range of a receiver in a digital radio transmission system comprising:

a signal limiter, a limiter-connected A/D-converter having a dynamic range whose upper limit is limited by an upper limit value, a detector which is connected to the A/D-converter and which includes means for detecting the signal quality of a signal processed in the A/D-converter, wherein the signal limiter includes means for limiting an incoming signal so that the signal strength of a signal delivered by the signal limiter will exceed said upper limit value and so that the signal quality detected in the detector will exceed a predetermined minimum accepted signal quality when the signal strength of the signal delivered by the signal limiter exceeds the upper limit value; and wherein the detector further comprises means for down-mixing an output of the A/D-converter to obtain a baseband signal; and means for mixing the baseband signal partly with a sine signal and partly with a cosine signal to enable the mixed signal to be analyzed in a decoder.

\* \* \* \* \*